US012656312B2

(12) United States Patent
Chong et al.

(10) Patent No.:  US 12,656,312 B2
(45) Date of Patent:  Jun. 16, 2026

(54) BIOMOLECULE TRANSFER SYSTEM AND METHODS

(71) Applicants:LIFE TECHNOLOGIES CORPORATION, Carlsbad, CA (US); LIFE TECHNOLOGIES HOLDINGS PTE LTD, Singapore (SG); PIERCE BIOTECHNOLOGY, INC., Rockford, IL (US); THERMO FISHER ISRAEL LTD, Ness-Ziona (IL)

(72) Inventors: Chee Woei Chong, Singapore (SG); Hwee Siong Kuah, Singapore (SG); Mio Xiu Lu Ling, Singapore (SG); Kian Soon Wong, Singapore (SG); Jun Yao Lim, Singapore (SG); Jia Ni Beatrice Lim, Singapore (SG); Li Yong Ong, Singapore (SG); Xin Jie Jeryl Cheng, Singapore (SG); Kok Shyong Chong, Singapore (SG); Zeqi Tan, Singapore (SG); Kguan Tyng Lim, Singapore (SG); Wei Fuh Teo, Singapore (SG); Quoc Cuong Dinh, Singapore (SG); Tong Bao, Singapore (SG); Beng Heng Lim, Singapore (SG); Paul Haney, Rockford, IL (US); Brian Steer, Carlsbad, CA (US); Michael Thacker, Carlsbad, CA (US); Boguslawa Dworecki, Rockford, IL (US); Kelli Feather-Henigan, Rockford, IL (US); Xin Mathers, Carlsbad, CA (US); Shahar Schlezinger, Ness-Ziona (IL); Ronen Benarieh, Ness-Ziona (IL)

(73) Assignees: Life Technologies Corporation, Carlsbad, CA (US); Life Technologies Holdings PTE LTD, Singapore (SG); Pierce Biotechnology, Inc., Rockford, IL (US); Thermo Fisher Israel LTD, Ness-Ziona (IL)

( * ) Notice: Subject to any disclaimer, the term of this patent is extended or adjusted under 35

U.S.C. 154(b) by 287 days.

(21) Appl. No.: 18/112,933

(22) Filed: Feb. 22, 2023

(65) Prior Publication Data

US 2023/0273153 A1     Aug. 31, 2023

Related U.S. Application Data

(60) Provisional application No. 63/314,189, filed on Feb. 25, 2022.

(51) Int. Cl.
*G01N 27/447*          (2006.01)
(52) U.S. Cl.
CPC . *G01N 27/44739* (2013.01); *G01N 27/44708*
(2013.01)
(58) Field of Classification Search
CPC ....... G01N 27/44739; G01N 27/44708; G01N
33/68
See application file for complete search history.

(56) References Cited

U.S. PATENT DOCUMENTS

D231,609 S      5/1974  Broek et al.
4,810,348 A  *  3/1989  Sarrine ............ G01N 27/44721
204/612

(Continued)

FOREIGN PATENT DOCUMENTS

AU          2002240722 B2      8/2006
CN             110361552 A  * 10/2019  ............. G01N 21/75

(Continued)

OTHER PUBLICATIONS

MilliporeSigma, Protein blotting handbook, the 6th edition, Aug. 2017 (Year: 2017).*

(Continued)

*Primary Examiner* — Shizhi Qian

(74) *Attorney, Agent, or Firm* — BakerHostetler

(57)                    ABSTRACT

A protein transfer system includes at least one base configured to receive one or more consumable protein transfer stacks and at least one lid configured to cover the base. The lid(s) comprise(s) one or more electrodes for supplying current to the one or more consumable protein transfer stacks. The protein transfer system further includes at least one voltage source configured to supply the current to the one or more consumable protein transfer stacks, one or more processors, and one or more hardware storage devices storing instructions that are executable by the one or more processors to configure the protein transfer system to control operation of the one or more voltage sources.

17 Claims, 11 Drawing Sheets

(56)                    References Cited

U.S. PATENT DOCUMENTS

| | | | | | |
|---|---|---|---|---|---|
| 4,959,133 | A | | 9/1990 | Adcock | |
| 5,104,512 | A | * | 4/1992 | Gombocz | G01N 27/44704 |
| | | | | | 204/616 |
| 6,599,410 | B1 | * | 7/2003 | Steiner | G01N 27/44704 |
| | | | | | 204/616 |
| D537,951 | S | | 3/2007 | Okamoto et al. | |
| D556,914 | S | | 12/2007 | Okamoto et al. | |
| D819,225 | S | | 5/2018 | Mead et al. | |
| D833,033 | S | | 11/2018 | Foster et al. | |
| D851,278 | S | | 6/2019 | Bulloch et al. | |
| D857,917 | S | | 8/2019 | Mead et al. | |
| D865,995 | S | | 11/2019 | Benarieh et al. | |
| D874,017 | S | | 1/2020 | Jenoski et al. | |
| D888,985 | S | | 6/2020 | Hsieh | |
| D914,906 | S | | 3/2021 | Klein et al. | |
| D982,181 | S | | 3/2023 | Tanaka | |
| D983,408 | S | | 4/2023 | Liu et al. | |
| D984,293 | S | | 4/2023 | Tam | |
| D997,381 | S | | 8/2023 | Fang et al. | |
| 2011/0297544 | A1 | * | 12/2011 | Latham | B01D 57/02 |
| | | | | | 204/464 |
| 2011/0297545 | A1 | | 12/2011 | Latham et al. | |
| 2016/0041121 | A1 | * | 2/2016 | Latham | G01N 27/44782 |
| | | | | | 204/464 |
| 2016/0299099 | A1 | | 10/2016 | Uri et al. | |
| 2016/0377574 | A1 | * | 12/2016 | Jonsson Axelsson | |
| | | | | | G01N 27/44739 |
| | | | | | 204/614 |
| 2018/0221882 | A1 | | 8/2018 | Roberts et al. | |
| 2020/0132623 | A1 | * | 4/2020 | Chen | G01N 27/44739 |
| 2022/0097057 | A1 | | 3/2022 | Lin | |
| 2022/0099624 | A1 | | 3/2022 | Chang et al. | |
| 2023/0273153 | A1 | | 8/2023 | Chong et al. | |

FOREIGN PATENT DOCUMENTS

| | | | |
|---|---|---|---|
| CN | 305838453 | | 6/2020 |
| EP | 0 627 954 | B1 | 4/1996 |
| IN | 398895-001 | | 1/2024 |
| JP | H01-301357 | A | 12/1989 |
| JP | H05-330094 | A | 3/1998 |
| JP | 2005-288779 | A | 10/2005 |
| JP | 2013-067041 | A | 4/2013 |
| WO | WO2002077630 | A1 * | 10/2002 |
| WO | 2005/098408 | A1 | 10/2005 |

OTHER PUBLICATIONS

Invitrogen, iBoltTM 2 dry blotting system user guide, Revision E.0, Jan. 2019 (Year: 2019).*

Cheng et al. , CN110361552A, English translation, 2019 (Year: 2019).*

Bio_Rad , Power/Running conditions, https://www.bio-rad.com/en-us/applications-technologies/power-running-conditions?ID=LUSPWZIVK, published on May 23, 2018 (Year: 2018).*

Invitrogen, iBlot dry blotting system, MAN0000560, May 2012 (Year: 2012).*

"www.bostonind.com: Qiagen QIAcube Connect DNA/RNA/ Protein Purification." Found online Jan. 31, 2024 at youtube.com. Reference dated Nov. 2, 2023. Retrieved from https://www.youtube.com/watch?v=wrHQ-HCH_8o.

"Scilogex: Fastgel Gel Imaging System." Found online Jan. 31, 2024 at youtube.com. Reference dated Feb. 13, 2020. Retrieved from https://www.youtube.com/watch?v =-2ksrexZ3tg.

"Thermo Fisher: Owl P82 Dual Gel Vertical Electrophoresis System." Found online Jan. 31, 2024 at amazon.com. Reference dated Apr. 11, 2013. Retrieved from https://www.amazon.com/Thermo-Fisher-P82-Vertical-Electrophoresis/dp/B00BZ4X8ZO.

"MaxCyte: Understanding Flow Electroporation." Found online Jan. 31, 2024 at youtube.com. Reference dated Jun. 27, 2023. Retrieved from https://www.youtube.com/watch?v=BXXCenQGVC0.

International Search Report issued in International Patent Application No. PCT/US2023/063042 mailed May 26, 2023.

Instagram: aspirememberprogram, Found online Jun. 4, 2025 at instagram.com. Reference dated Jul. 30, 2024. Retrieved from https://www.instagram.com/p/C-DYFZ8zZVC/.

LabX: Applied Buisystems ProFlex PCR System with 3x32-Well Sample Block, Found online Jun. 4, 2025 at labx.com. Reference dated Jul. 16, 2024. Retrieved from https://www.labx.com/item/applied-biosystems-proflex-pcr-system-with-3x32-well-sample/DIS-41886-4828.

Youtube: Thermo iBlot3 Dry transfer system. Found online Jun. 4, 2025 at youtube.com. Reference dated Aug. 28, 2023. Retrieved from https://www.youtube.com/watch?v=NVCrulcGvOM.

* cited by examiner

FIG. 1

BIOMOLECULE TRANSFER SYSTEM AND METHODS

CROSS-REFERENCE TO RELATED APPLICATIONS

This application claims priority to and the benefit of U.S. Provisional Application No. 63/314,189, filed Feb. 25, 2022, which is incorporated by reference in its entirety.

BACKGROUND

Various techniques are used in the field of molecular biology to facilitate analysis of macromolecules (such as deoxyribonucleic acid (DNA), ribonucleic acid (RNA), proteins, etc.). One analytical technique for analyzing biomolecules, such as proteins by way of non-limiting example, involves (1) separating proteins by size, (2) transferring the proteins to a solid support, and (3) marking target proteins using a primary and/or secondary antibody for visualization. This analytical technique is referred to as western blotting or protein immunoblotting.

The transfer of proteins to a solid support (step (2) of western blotting as described above) can be achieved through a method called electroblotting. Electroblotting utilizes electrical current and a transfer buffer to drive proteins (or nucleic acids) onto a membrane. After electrophoresis is performed to separate proteins (or nucleic acids) by size, a transfer stack may be arranged. The transfer stack may include (in order from cathode to anode) a sponge, one or more filters (e.g., filter paper soaked in transfer buffer), the electrophoresis gel, a solid support membrane (e.g., polyvinylidene fluoride (PVDF), nitrocellulose or nylon membrane), additional filter(s) (e.g., additional filter paper soaked in transfer buffer), and an additional sponge. Once prepared, a current may be applied to the transfer stack for a suitable time period to cause the proteins to transpose from the electrophoresis gel to the solid support membrane. The protein transfers in the direction of current flow, necessitating the solid support membrane to be situated between the electrophoresis gel and the anode.

Electroblotting may be performed under wet conditions (e.g., with the transfer stack positioned within a tank of transfer buffer) or dry/semi-dry conditions (e.g., without the transfer stack positioned within a tank of transfer buffer). Wet transfer techniques typically are time-consuming and generate hazardous waste and therefore require non-trivial setup and cleanup procedures. Dry/semi-dry transfer techniques typically generate less hazardous waste than wet transfer techniques.

Conventional biomolecule and protein transfer systems suffer from a number of shortcomings, and there is an ongoing need and desire for improved biomolecule and protein transfer systems.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Implementations of the present disclosure extend at least to biomolecule transfer systems, components thereof, and/or methods associated therewith.

Some embodiments provide a biomolecule transfer system that includes at least one base configured to receive one or more consumable biomolecule transfer stacks.

Some embodiments provide a protein transfer system that includes at least one base configured to receive one or more consumable protein transfer stacks. The protein transfer system further includes at least one lid configured to cover the base. The at least one lid comprises one or more electrodes for supplying current to the one or more consumable protein transfer stacks. The protein transfer system further includes at least one voltage source configured to supply the current to the one or more consumable protein transfer stacks, one or more processors, and one or more hardware storage devices storing instructions that are executable by the one or more processors to configure the protein transfer system to control operation of the one or more voltage sources.

In some embodiments, a protein transfer system further includes at least one lid configured to cover one or more bases. The at least one lid comprises one or more electrodes for supplying current to the one or more consumable protein transfer stacks. The protein transfer system further includes at least one voltage source configured to supply the current to the one or more consumable protein transfer stacks, one or more processors, and one or more hardware storage devices storing instructions that are executable by the one or more processors to configure the protein transfer system to control operation of the one or more voltage sources.

In some embodiments, a protein transfer system includes multiple base units, each having a corresponding lid and being independently controllable, such that different protein transfer runs with different protein transfer parameters can be performed simultaneously using the same protein transfer system. In some embodiments, a protein transfer system comprises two bases.

In some embodiments, each base of a protein transfer system of the disclosure is configured to house one or more protein transfer stacks and is configured to perform multiple protein transfer runs per base. In some example embodiments, each base of a protein transfer system of the disclosure can house for example, one regular consumable protein transfer stack or two mini consumable protein transfer stacks. Other combinations of more than one protein transfer stacks can be housed and run simultaneously in one base of a protein transfer system of the disclosure.

In some embodiments, a protein transfer system of the disclosure includes a cooling system comprising at least one heat sink in thermal communication with a corresponding cathode plate of a corresponding lid, at least one air inlet, at least one air outlet, and at least one fan configured to draw air through the at least one air inlet and direct the air along an air-cooling path that extends through the at least one heat sink and toward the at least one air outlet.

In some embodiments, a protein transfer system of the disclosure includes one or more compression features configured to secure over at least a portion of a perimeter edge of a consumable protein transfer stack when the lid is closed over the consumable protein transfer stack. A cathode plate of the protein transfer system may be configured to translate relative to the compression feature(s) to enable the cathode plate to disengage from the consumable protein transfer stack while the compression feature(s) retain the consumable protein transfer stack.

In some embodiments, a protein transfer system of the disclosure is configured to perform a consumable protein transfer stack detection operation to prevent damage to protein transfer stacks when an improper connection exists between the protein transfer stack and the protein transfer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

FIG. 1 illustrates a front perspective view of an example implementation of a protein transfer system, in accordance with implementations of the present disclosure;

DETAILED DESCRIPTION

Overview of Example Benefits

Figure 2:
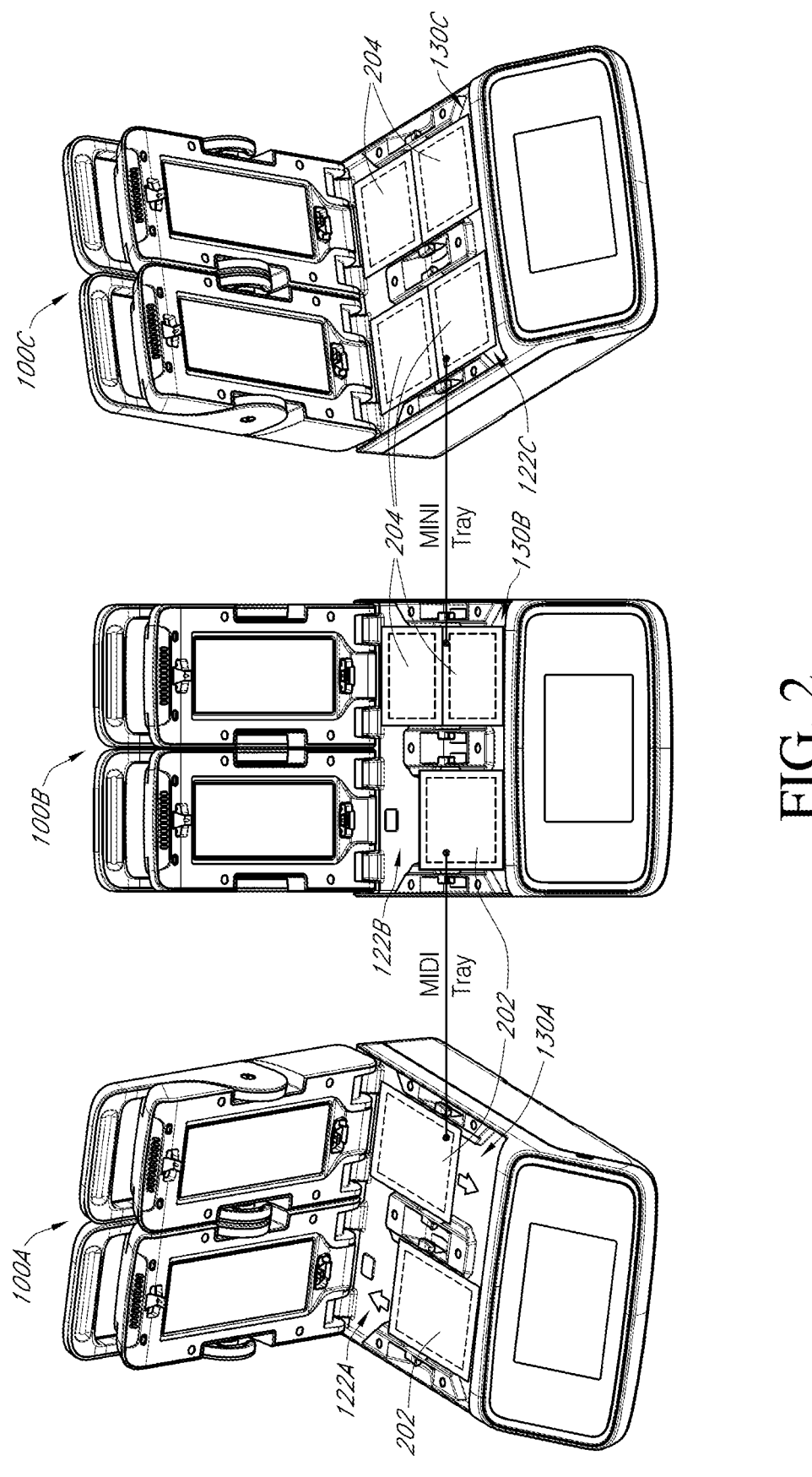
FIG. 2 illustrates front perspective views of protein transfer systems housing different configurations of consumable transfer stacks.

Implementations of the present disclosure extend at least to protein transfer systems (e.g., dry/semi-dry protein transfer systems for facilitating western blotting), and/or components thereof. The disclosed embodiments may be implemented to address various shortcomings associated with at least some conventional protein transfer systems and/or techniques. The following discussion outlines some example improvements and/or practical applications that may be provided by the disclosed embodiments. It will be appreciated, however, that the following are examples only and that the embodiments described herein are in no way limited to the example improvements discussed herein.

Although generally faster than wet transfer techniques, dry/semi-dry transfer techniques also require significant setup and cleanup procedures, which limits the throughput of conventional dry/semi-dry protein transfer systems.

At least some protein transfer systems of the present disclosure include multiple bases that can independently receive protein transfer stacks to allow independent protein transfer processes to be performed in parallel on the same protein transfer system (e.g., two or more bases). The different protein transfer processes may, advantageously, be independently controlled to have different protein transfer specifications and/or configurations (e.g., different current settings, different start and or end times, etc.). In some implementations, a base of a protein transfer system, in accordance with the present disclosure, can receive up to two separate protein transfer stacks simultaneously (e.g., allowing a protein transfer system to process up to four protein transfer stacks simultaneously). Such features may increase the throughput of dry/semi-dry protein transfer systems, particularly when compared to existing protein transfer systems.

Another problem that conventional protein transfer systems face is that transfer stacks often become stuck to cathodes of conventional protein transfer systems during the protein transfer process, presenting users with difficulty in extracting transfer stacks and solid support membranes to perform further analysis.

At least some protein transfer systems of the present disclosure include one or more compression features, components, or members that surround the cathode plate(s) thereof. The compression feature(s) may exert force on the protein transfer stack(s) positioned within base(s) of the protein transfer system. The cathode plate(s) may be configured to advance and retract relative to the compression feature(s), allowing the cathode plate(s) to advance into engagement with the protein transfer stack(s) and retract from engagement with the protein transfer stack(s) while the compression feature(s) exert force to secure the protein transfer stack(s). While retracting from engagement with the protein transfer stack(s), the compression feature(s) may maintain their force on the transfer stack(s), causing the transfer stack(s) to separate from the cathode plate(s) in a controlled manner. Embodiments of the present disclosure may thus allow users to acquire processed protein transfer stacks in a reliable and efficient manner.

As yet another example, conventional protein transfer systems typically fail to include features for controlling the ambient conditions of protein transfer, such as temperature. Consequently, utilizing conventional systems, different protein transfer runs may experience different temperature profiles throughout the run (even when the target protein(s), applied current(s), and run time(s) are the same).

At least some protein transfer systems of the present disclosure include a cooling system configured to facilitate temperature control of a transfer stack during the transfer process. The cooling system may include a heat sink in thermal communication with the cathode plate and may further include one or more fans positioned to direct air along an air cooling path that extends through the heat sink. Multiple cooling systems may be implemented, such as where a protein transfer system includes multiple bases. The cooling system may be configured to air-cool the transfer stack during a protein transfer process and/or immediately after a protein transfer process. Such functionality may enable protein transfer systems to replicate ambient conditions for different protein transfer runs (thereby improving repeatability and/or consistency), such as by imposing a common start temperature for multiple protein transfer runs, and/or by causing a transfer stack to follow a predefined target temperature curve during protein transfer runs.

Conventional protein transfer systems lack mechanisms to prevent transfer stack damage that may result from improper electrical connection between the transfer stack and a voltage source. For example, a short circuit in the connection between a protein transfer system and a transfer stack may cause the applied current to generate burn damage to the transfer stack. Burn damage may give rise to the need to perform duplicative gel electrophoresis to generate a new sample.

At least some protein transfer systems of the present disclosure are configured to perform a preliminary transfer stack (or consumable) detection operation prior to applying a full protein transfer voltage. The transfer stack detection operation may include closing a transfer stack detection current path and applying a transfer stack detection voltage therethrough. The transfer stack detection voltage maybe less than the full protein transfer voltage, thereby avoiding damage to the transfer stack in case the transfer stack is improperly connected to the protein transfer system (e.g., when a short circuit exists). The resistance resulting from applying the transfer stack detection voltage through the transfer stack detection current path may be measured to determine whether an appropriate connection exists between the protein transfer system and the transfer stack. If the connection between the transfer stack and the protein transfer system is determined to be correct based upon this measured resistance, a different current path may be closed for facilitating a protein transfer run, and the full protein transfer voltage may be applied (e.g., with confidence that burn damage to the transfer stack will be avoided).

Figure 1:
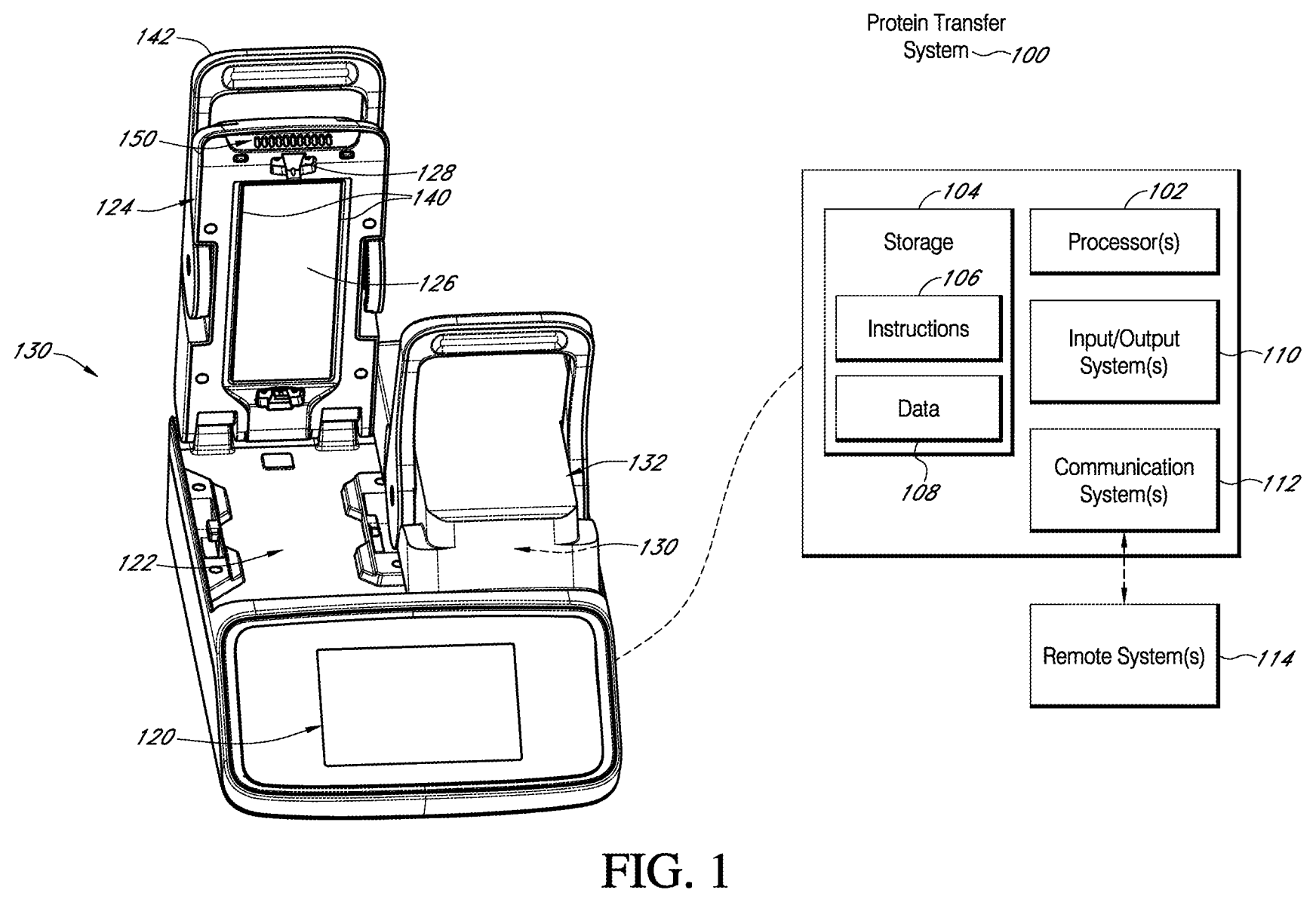

Attention will now be directed to FIGS. 1 through 7 which provide various supporting illustrations related to the disclosed embodiments.

Example Protein Transfer System Components

FIG. 1 illustrates various example components of a protein transfer system 100 that may be used to implement one or more disclosed embodiments. For example, the protein transfer system 100 of FIG. 1 may be configured to facilitate dry or semi-dry transfer of proteins for western blotting or other processing. Although FIG. 1 illustrates a protein transfer system 100 as including particular components, one will appreciate, in view of the present disclosure, that a protein transfer system 100 may comprise any number of additional and/or alternative components. Furthermore, one will appreciate, in view of the present disclosure, that the principles disclosed herein are not limited to the particular form and/or features of the protein transfer system 100 shown in FIG. 1.

Moreover, it will be understood that although various examples throughout this disclosure refer to a protein transfer system, the same principles, components, and features may readily be applied to a nucleic acid transfer system (e.g., a system configured to perform Southern blotting or northern blotting).

FIG. 1 illustrates that a protein transfer system 100 may include processor(s) 102, storage 104, input/output system(s) 110 (I/O system(s) 110), and communication system(s) 112. The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 112 or otherwise), or some combination thereof. Additional details related to processors (e.g., processor(s) 102), computer storage media (e.g., storage 104), and other computer components will be provided hereinafter.

The processor(s) 102 may be configured to execute instructions 106 stored within storage 104 to perform certain actions (e.g., voltage/current control, cooling system control, transfer stack detection, etc.). The actions may rely at least in part on data 108 stored on storage 104 in a volatile or non-volatile manner.

In some instances, the actions may rely at least in part on communication system(s) 112 for receiving data from remote system(s) 114, which may include, for example, computing devices, sensors, and/or others. The communications system(s) 112 may comprise any combination of software or hardware components that are operable to facilitate communication between on-system components/devices and/or with off-system components/devices. For example, the communications system(s) 112 may comprise ports, buses, or other physical connection apparatuses for communicating with other devices/components. Additionally, or alternatively, the communications system(s) 112 may comprise systems/components operable to communicate wirelessly with external systems and/or devices through any suitable communication channel(s), such as, by way of non-limiting example, Bluetooth, ultra-wideband, WLAN, infrared communication, and/or others.

Furthermore, FIG. 1 illustrates that a protein transfer system 100 may comprise or be in communication with I/O system(s) 110. I/O system(s) 110 may include any type of input or output device such as, by way of non-limiting example, a display, a touch screen, a mouse, a keyboard or button interface, a controller, and/or others, without limitation. For instance, FIG. 1 illustrates that the protein transfer system includes a user interface element 120 implemented in the form of a graphical touch-screen user interface. The user interface element 120 is configured to display information related to operation of the protein transfer system 100 and/or receive user input for facilitating control of the protein transfer system 100 (e.g., to select parameters for, initiate, monitor, and/or end protein transfer runs).

The protein transfer system 100 includes various physical components that are usable to facilitate protein transfer operations. For example, FIG. 1 illustrates that the protein transfer system includes a base 122 that is configured to receive one or more protein transfer stacks (see FIG. 2). FIG. 1 also illustrates that the protein transfer system 100 includes a lid 124 associated with and configured to cover the base 122. The lid 124 includes various electrodes that are usable to supply current to one or more protein transfer stacks when such protein transfer stacks are positioned within the base 122 with the lid 124 closed thereover.

In the example shown in FIG. 1, the electrodes of the lid 124 are illustrated as a cathode plate 126 and an anode contact 128. The electrode(s) of a protein transfer system 100 may be implemented in other configurations/formats than that shown in FIG. 1, without limitation. For example, the polarity of the plate and contacts may be reversed, or one or more of the anode(s) and/or cathode(s) may be positioned on another portion of the protein transfer system 100 rather than the lid 124.

FIG. 1 furthermore illustrates that the protein transfer system 100 further includes a second base 130, which includes a corresponding second lid 132. The second base 130 and the second lid 132 may include features and/or functionalities that are similar to those of base 122 and lid 124 (e.g., the second base 130 may be sized to receive one or more protein transfer stacks, and the second lid 132 main include one or more electrodes to facilitate application of current through such protein transfer stacks).

The protein transfer system 100 may be advantageously configured to independently perform different protein transfer operations in association with the different bases 122 and 130 (and their corresponding lids 124 and 132, respectively). For example, instructions 106 may be executable by the processor(s) 102 to enable users to provide user input at the user interface element 120 to facilitate a first protein transfer run utilizing base 122 and lid 124 and to facilitate a second protein transfer run utilizing second base 130 and second lid 124 (using one or more different consumable protein transfer stacks). The first and second protein transfer runs may comprise different voltages, currents, program methods, starting times, ending times, cooling system controls, and/or other protein transfer parameters, any of which may be independently controlled via the user interface element 120. For instance, one or more voltage sources of the protein transfer system 100 may be configured to independently supply different currents through the protein transfer stack(s) positioned within base 122 and the protein transfer stack(s) positioned within base 130 (e.g., via the anode(s) and cathode(s) of the corresponding lids 124 and 132, respectively).

The transfer parameters (e.g., voltage, current, runtime, temperature, etc.) of the various protein transfer runs performed utilizing the protein transfer system 100 may be displayed on the user interface element 120 (e.g., in real-time and/or as a function of time). Logs of such transfer parameters may be stored and/or exported for future access/analysis.

Consumable protein transfer stacks usable in conjunction with a protein transfer system 100 may include various components and/or layers. For instance, a consumable protein transfer stack may comprise (from the anode side to the cathode side) one or more absorbing felts, an anode sheet (e.g., copper or other electroplating material), a buffer ion reservoir incorporated into an anode gel matrix, a nitrocellulose, polyvinylidene difluoride, or nylon transfer membrane, a plastic separator (removed/removable before transfer), a buffer ion reservoir incorporated into a cathode gel matrix (e.g., sandwiched between a copper cathode sheet and a filter paper), and a top absorbing felt (e.g., with a fold-in aluminum tab). A consumable protein transfer stack may be positioned within a disposable tray, and the disposable tray may be placed within a base of a protein transfer system to facilitate protein transfer processing. The disposable tray may include one or more felts for absorbing excess liquid released during the protein transfer run (e.g., thereby facilitating easy clean-up).

FIG. 2 illustrates front perspective views of protein transfer systems 100A, 100B, and 100C housing different configurations of consumable transfer stacks. The protein transfer systems 100A, 100B, and 100C correspond to the protein transfer system 100 described hereinabove. As shown in FIG. 2, protein transfer systems as described herein may be configured to receive and process different sizes and/or quantities of consumable protein transfer stacks. For example, the different bases 122A and 130A of protein transfer system 100A each include a regular-size or MIDI consumable protein transfer stack 202 positioned therein (each regular-size consumable protein transfer stack 202 being positioned within a respective regular-size consumable tray). As another example, the first base 122B of protein transfer system 100B includes a regular-size or MIDI consumable protein transfer stack 202 positioned therein, whereas the second base 130B of the protein transfer system 100B includes two small or MINI consumable protein transfer stacks 204 (each small consumable protein transfer stack 204 being positioned within a respective small consumable tray). As yet another example, the different bases 122C and 130C of protein transfer system 100C each include two small or MINI consumable protein transfer stacks 204 positioned therein.

As is evident from FIG. 2, MINI consumable protein transfer stacks 204 are smaller in at least one dimension relative to MIDI consumable protein transfer stacks 202. By way of non-limiting example, a MINI consumable protein transfer stack 204 may comprise layer area dimensions within a range of about 5 cm×5 cm to about 11 cm×11 cm (such as layer area dimensions of about 8 cm×8 cm), while a MIDI consumable protein transfer stack 202 may comprise layer area dimensions within a range of about 5 cm×10 cm to about 11 cm×16 cm (such as layer area dimensions of about 8 cm to about 13 cm).

Other protein transfer stack configurations not explicitly shown in FIG. 2 are within the scope of the present disclosure (e.g., a protein transfer system 100 housing a single MIDI consumable protein transfer stack 202 within a single base (with no transfer stack in the other base), a protein transfer system 100 housing one or two MINI consumable protein transfer stacks 204 within a single base (with no transfer stack in the other base), a protein transfer system 100 housing a single MINI consumable protein transfer stack 204 in each of its bases, a protein transfer system 100 housing a single MINI consumable protein transfer stack 204 in one of its bases and housing two MINI consumable protein transfer stacks 204 in the other of its bases, a protein transfer system 100 housing a single small consumable protein transfer stack 204 in one base and housing a single regular-size protein transfer stack 202 in the other base, etcetera). These and other combinations of more than one protein transfer stacks can be housed and run simultaneously in one base of a protein transfer system of the disclosure. Accordingly, in some embodiments and implementations, each base of a protein transfer system of the disclosure can house one or more protein transfer stacks and is configured to perform multiple protein transfer runs per base.

Example Consumable Disengagement Features

Figure 3A:
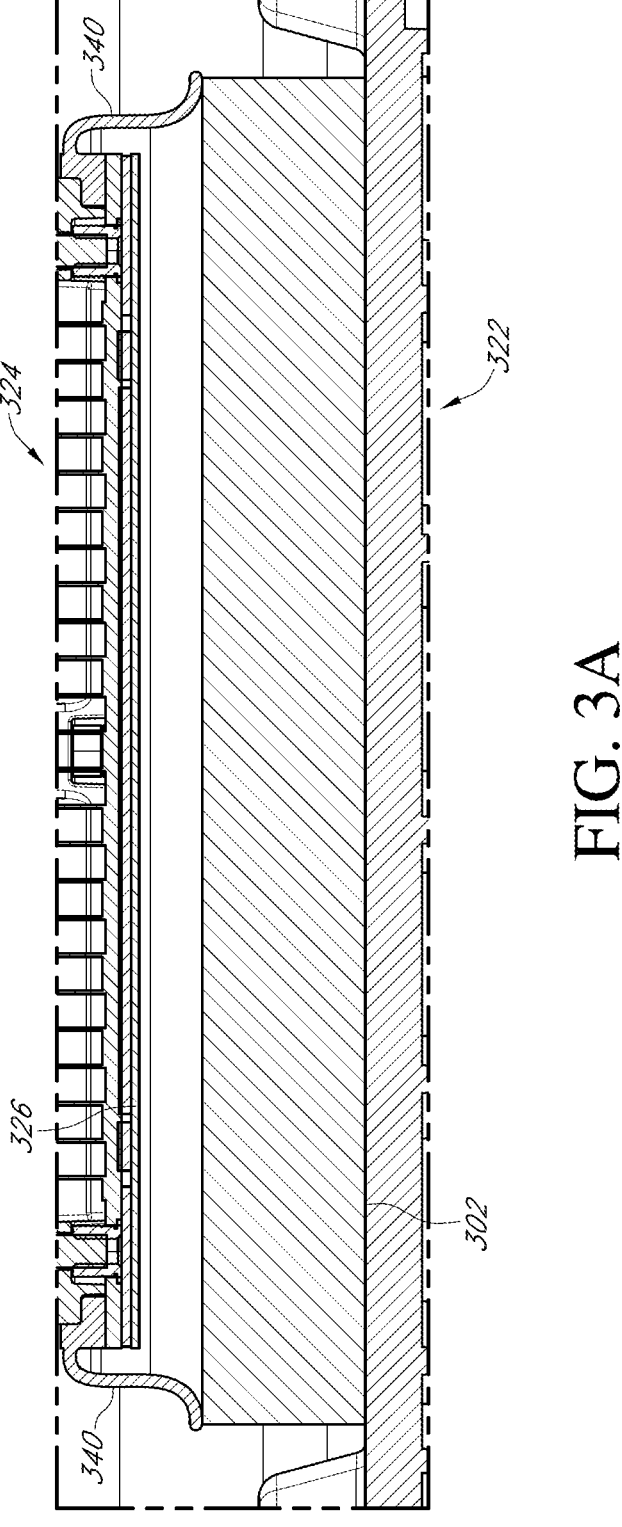
FIGS. 3A, 3B, and 3C illustrate front sectional views of a protein transfer system showing example functionality of a cathode plate of the protein transfer system.
Figure 3B:
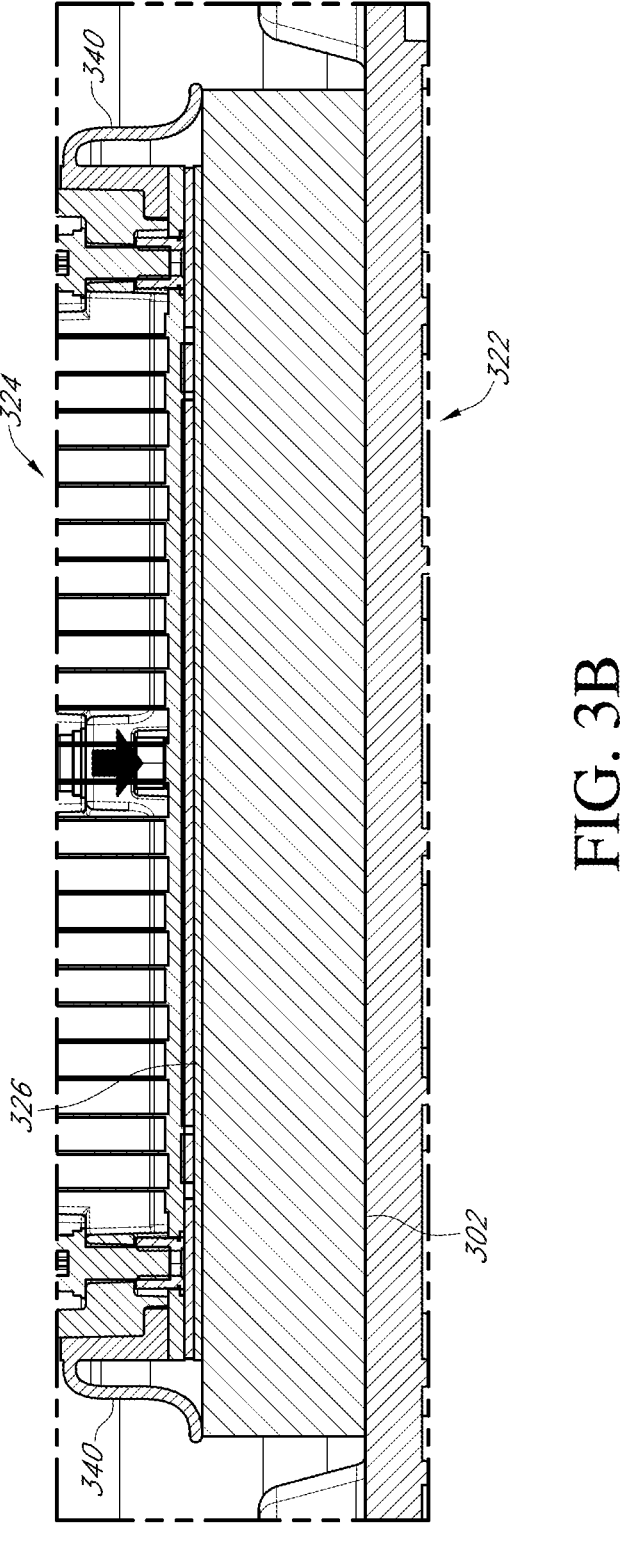
Figure 3C:
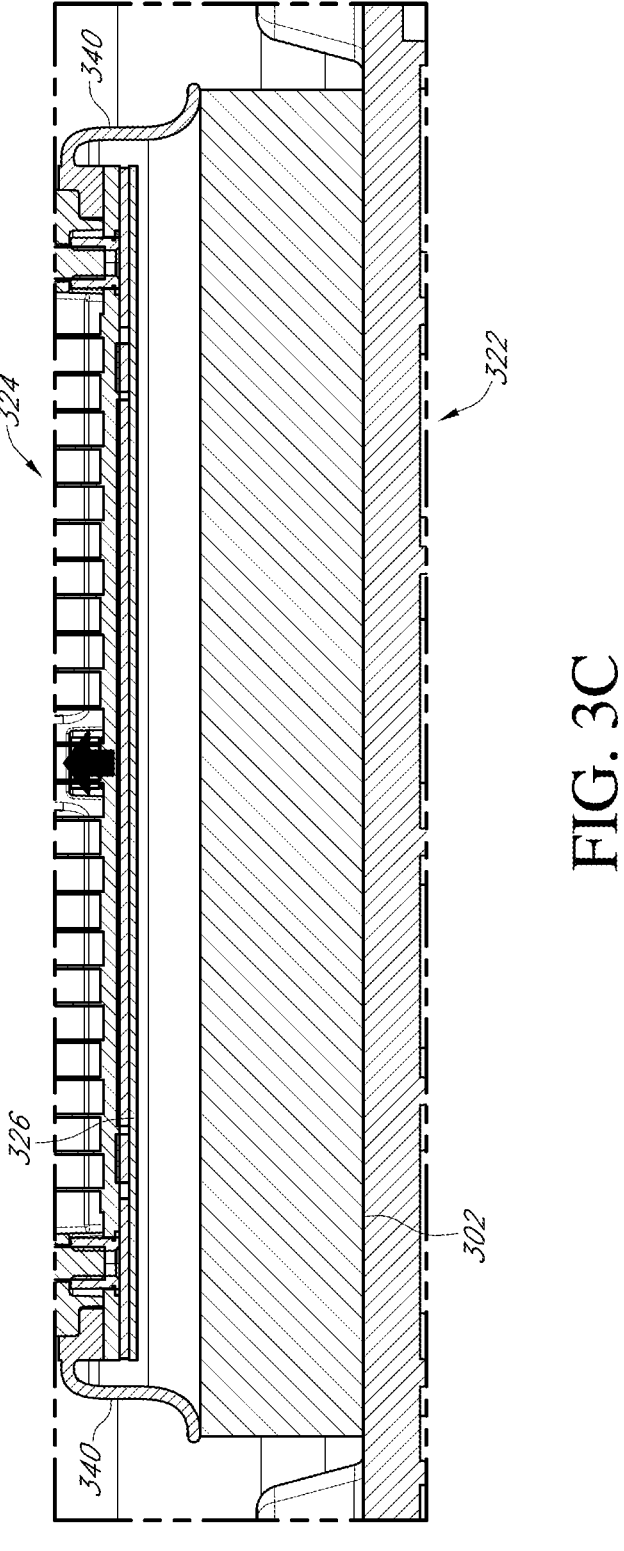

As noted above, consumable protein transfer stacks often become stuck to cathodes of conventional protein transfer systems during the protein transfer process, presenting users with difficulty in extracting transfer stacks and solid support membranes to perform further analysis. FIGS. 3A, 3B, and 3C illustrate front sectional views of a lid 324 of a protein transfer system showing example functionality of a cathode plate 326 (e.g., corresponding to cathode plate 126 of lid 124 of protein transfer system 100 of FIG. 1), which provides for a desirable disengagement between the cathode plate 326 and a protein transfer stack after a protein transfer run.

FIG. 3A shows the lid 324 closed over a base 322 (e.g., corresponding to base 122 of FIG. 1) and illustrates example positioning of a protein transfer stack 302 within the base 322. FIG. 3A furthermore illustrates that the lid 324 may include compression features 340 extending along edges of the cathode plate 326 (example positioning of compression features relative to a cathode plate is also shown in FIG. 1, depicting compression features 140 positioned about the cathode plate 126). The specific form of the compression features 340 (and 140) described herein is provided by way of example only and is not limiting of the principles described herein. For example, multiple compression features may exist along a single edge of a cathode plate, or a compression feature may form a frame that extends about an entire perimeter of a cathode plate.

With the lid 324 closed over the base 322 as shown in FIG. 3A, the compression features 340 secure over perimeter edges of the protein transfer stack 302. The compression features 340 may be formed from an at least partially flexible/elastic material and be shaped to enable the compression features 340 to exert a biasing force on the perimeter edges (or other portion(s)) of the protein transfer stack 302.

FIG. 3A shows the cathode plate 326 in a disengaged position, with the cathode plate 326 disengaged from and out of contact with the protein transfer stack 302. In some implementations, cathode plates 326 is configured to translate into contact with the protein transfer stack 302 (e.g., into an engaged position). For example, FIG. 3B depicts the cathode plate 326 having translated from a disengaged position (out of contact with the protein transfer stack 302) into an engaged position (according to the yellow arrow shown in FIG. 3B). FIG. 3B shows the cathode plate 326 extending into the volume of the protein transfer stack 302, indicating that translation of the cathode plate 326 into the engaged position may cause the cathode plate 326 to exert a compression force on the protein transfer stack 302. In some implementations, the cathode plate 326 is able to advance into multiple different engagement positions, each being associated with a respective amount of compression force exerted by the cathode plate 326 on the protein transfer stack 302 (e.g., to facilitate different protein transfer run parameters).

The cathode plate 326 may thus translate in at least one dimension relative to the compression features 340 (e.g., the compression features 340 may remain in the same position relative to the protein transfer stack 302 as the cathode plate 326 translates into engagement with the protein transfer stack 302). While the cathode plate 326 is in an engaged position, a protein transfer process may be run. After completion of the protein transfer process, the cathode plate 326 may translate out of engagement with the protein transfer stack 302 (into the disengaged position), as indicated in FIG. 3C via the yellow arrow. While the cathode plate 326 translates out of engagement with the protein transfer stack 302, the compression features 340 continue to exert a compression force on the protein transfer stack 302, thereby retaining the protein transfer stack 302 and allowing the cathode plate 326 to disconnect from the protein transfer stack 302 in a reliable and repeatable manner that avoids disturbance of the protein transfer stack 302.

Translation of the cathode plate 326 between the disengaged position and the engaged position as shown in FIGS. 3B and 3C can be accomplished in various ways. For instance, a manual actuator of the protein transfer system may be mechanically coupled to the cathode plate 326 such that operation of the actuator causes translation of the cathode plate 326. An example form of such an actuator is shown in FIG. 1 as the handle 142 of the lid 124, which may be rotated between an open and closed position to cause the cathode plate 126 to transition between the disengaged (raised) position and the engaged (lowered) position. In other examples, translation of the cathode plate 326 is accomplished via a motorized system, which may be controllable via the processor(s) 102, storage 104, user interface element 120, and/or other components of a protein transfer system 100.

One will appreciate, in view of the present disclosure, that compression features of a protein transfer system may compress multiple protein transfer stacks simultaneously, and that a cathode plate of a protein transfer system may translate into engagement with multiple protein transfer stacks simultaneously.

Example Cooling Systems of Protein Transfer Systems

Figure 4:
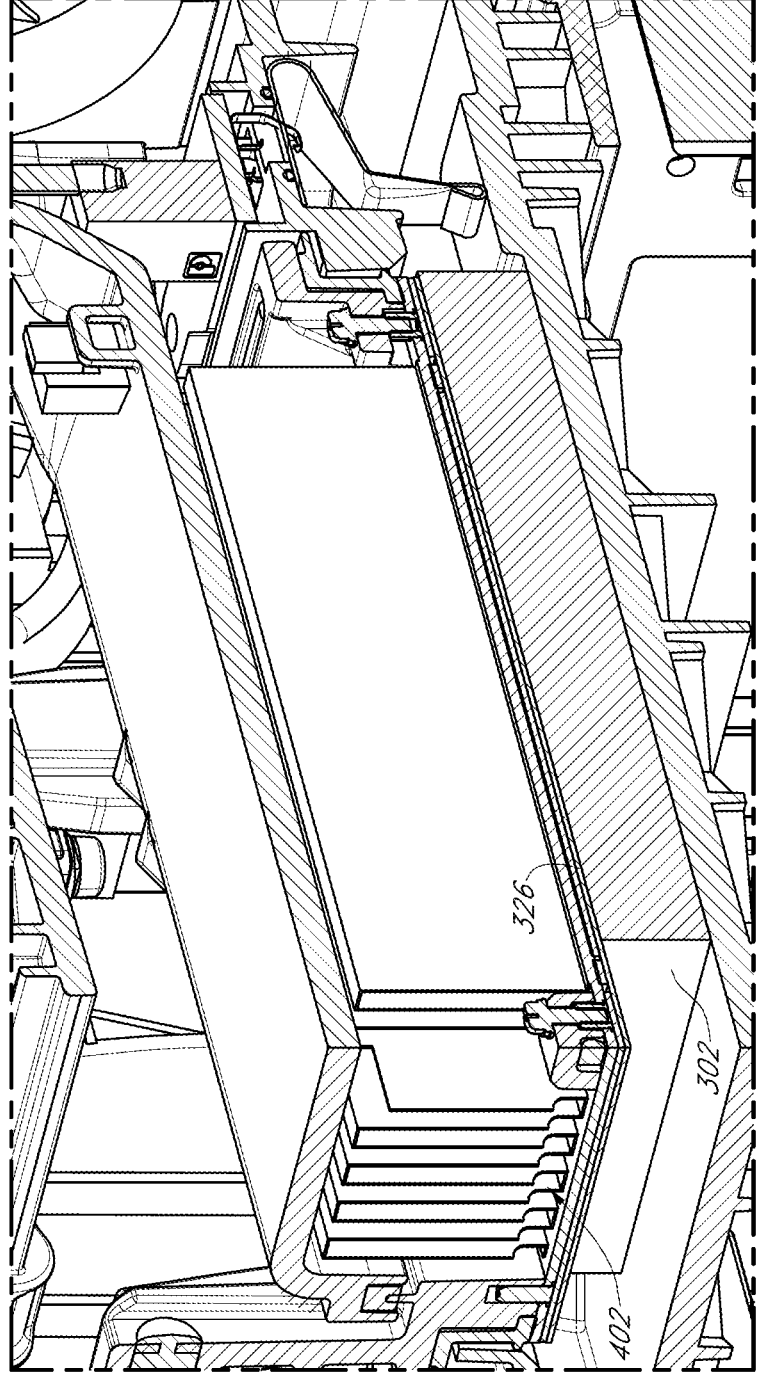
FIG. 4 illustrates a perspective sectional view of a protein transfer system showing example components of a cooling system.

FIG. 4 illustrates a perspective sectional view of a protein transfer system (e.g., protein transfer system 100) showing example components of a cooling system thereof. FIG. 4 shows that a cooling system of a protein transfer system may include a heat sink 402 connected to and in thermal communication with the cathode plate 326 thereof. During a protein transfer run, heat may transfer from the protein transfer stack 302 to the cathode plate 326 and from the cathode plate 326 to the heat sink 402. Heat may then dissipate from the heat sink 402 to air surrounding the fins of the heat sink 402. The air surrounding the fins of the heat sink 402 may be continuously changed (e.g., via one or more fans) to facilitate continuous cooling of the protein transfer components of the protein transfer system (e.g., protein transfer system 100).

Figure 5:
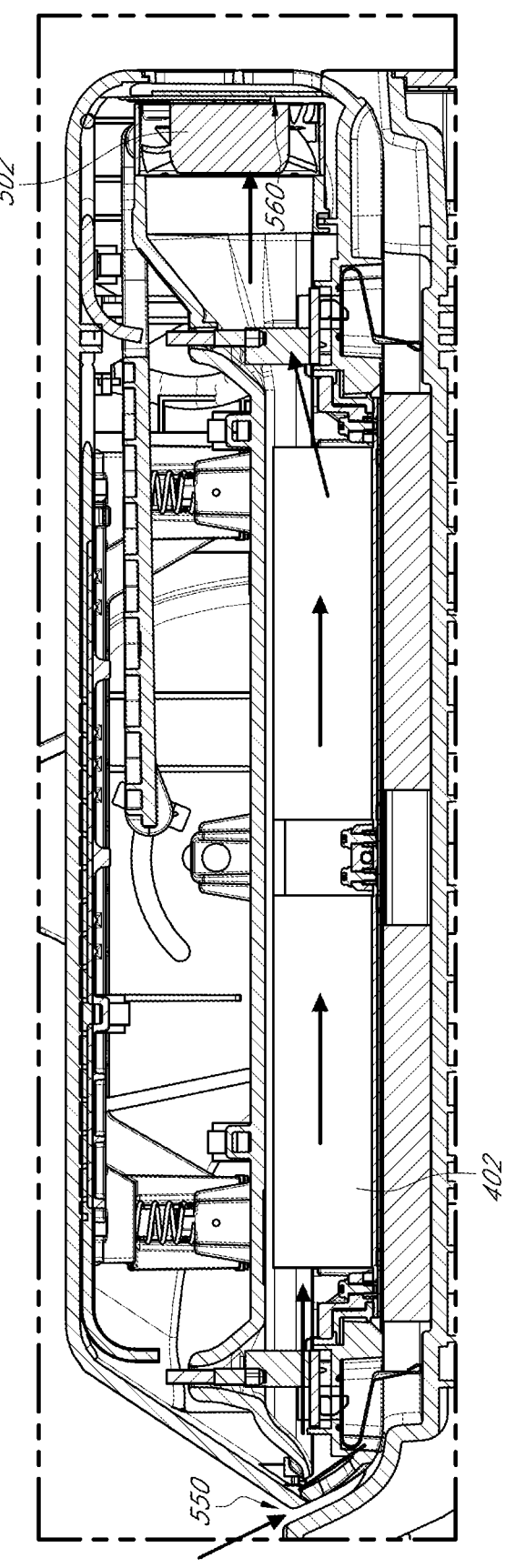
FIG. 5 illustrates a side sectional view of a protein transfer system showing example components of a cooling system.

FIG. 5 illustrates a side sectional view of a lid (e.g., corresponding to lid 124) of a protein transfer system (e.g., protein transfer system 100) depicting an air-cooling path (denoted by red arrows in FIG. 5) that extends through the heatsink of 402 of the protein transfer system. Movement of air along the air-cooling path may be facilitated via one or more fans, such as fan 502 shown in FIG. 5. In the example of FIG. 5, operation of the fan 502 may draw environment air into the air-cooling path via an air inlet 550 on the protein transfer system (FIG. 1 illustrates example placement of a corresponding air inlet 150 on the protein transfer system 100). After entry through the air inlet 550, the air may be directed through the heat sink 402 (e.g., between and among the fins of the heat sink 402) toward the fan 502. The air may become heated while passing among the heat sink 402 and may be subsequently directed out of the protein transfer system via an air outlet 560, thereby enabling transfer of heat out of the protein transfer system to facilitate advantageous control over temperature associated with protein transfer runs.

In view of the foregoing, a cooling system of a protein transfer system (e.g., protein transfer system 100) may comprise a heat sink (e.g., connected to a cathode), an air inlet, an air outlet, and one or more fans configured to draw air through the air inlet and direct the air along an air-cooling path that extends through the heat sink and toward the at air outlet. In the example of FIG. 5, the air inlet, the heat sink, and the air outlet are arranged on or within the lid (e.g., lid 124), but other configurations are within the scope of the present disclosure (e.g., arrangement of one or more of the foregoing components on the base of the protein transfer system, with, for example, the heat sink arranged to abut the underside of the tray of the protein transfer stack).

The fan(s) of a cooling system of a protein transfer system (e.g., fan 502) may be operated in various ways to facilitate control of temperature associated with one or more protein transfer runs (e.g., via the processor(s) 102, storage 104, and/or other components/controllers). For example, the fan (s) may be operable at different fan speeds and/or be configured to activate in response to different conditions (e.g., detecting one or more threshold temperature values of the cathode plate, the protein transfer stack, the ambient environment, and/or other components, elapsing of a pre-determined time period, in response to user input, etc.) to facilitate temperature control before, during, or after a protein transfer operation. By way of non-limiting example, the fan(s) may be operated to cause a temperature associated with the cathode, the base, the tray, the protein transfer stack, and/or other component(s) to approach or achieve a prede-termined target temperature or temperature curve during a protein transfer operation. As another example, the fan(s) may be configured to begin operating upon completion of a protein transfer run to cause a temperature of the cathode, the base, the tray, the protein transfer stack, and/or other component(s) to approach or achieve a predetermined target starting temperature after the protein transfer run and/or prior to a subsequent protein transfer run.

Figure 6A:
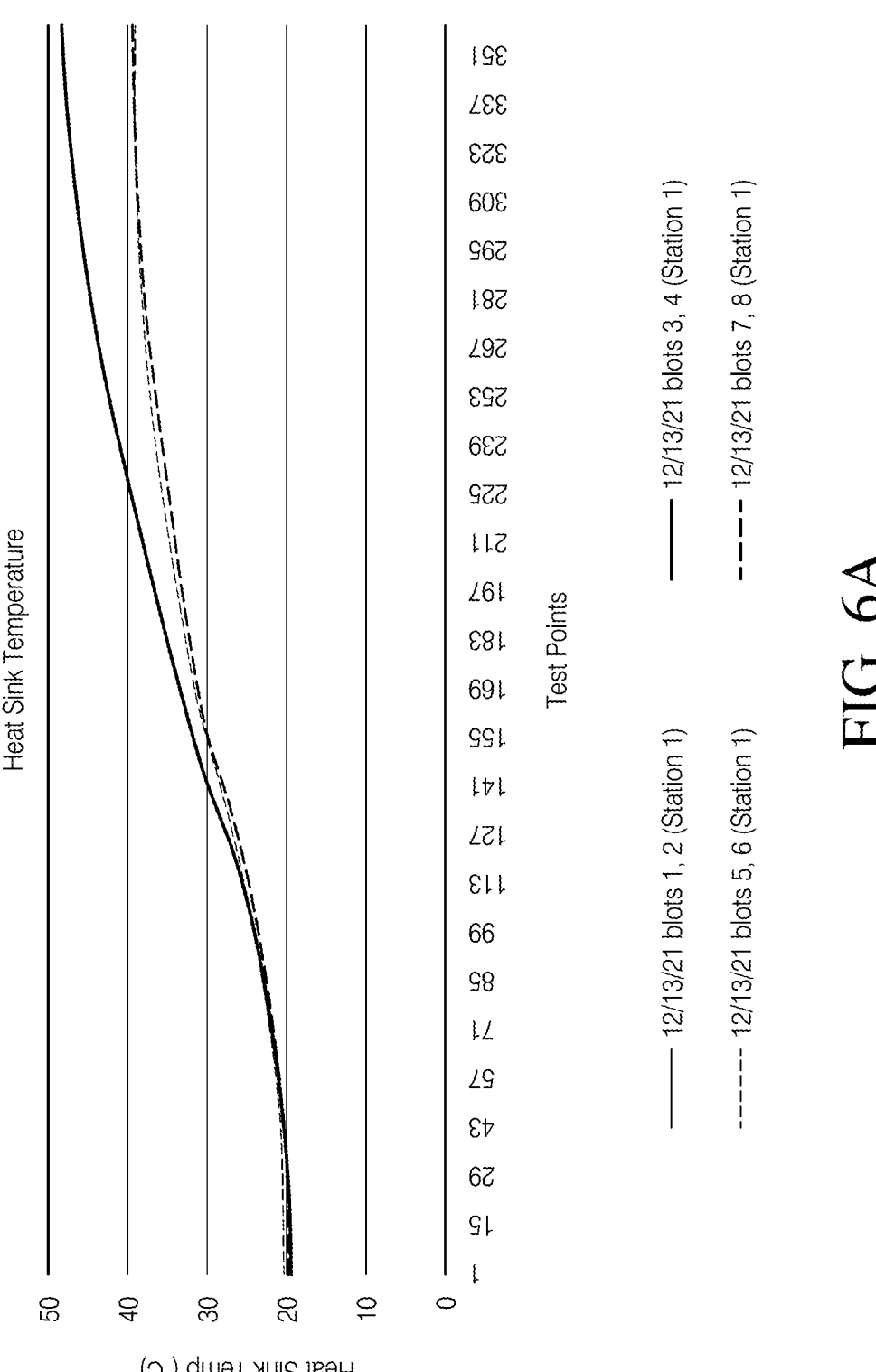
FIGS. 6A and 6B illustrate example graphs depicting heat sink temperature during protein transfer runs under various cooling system settings.
Figure 6B:
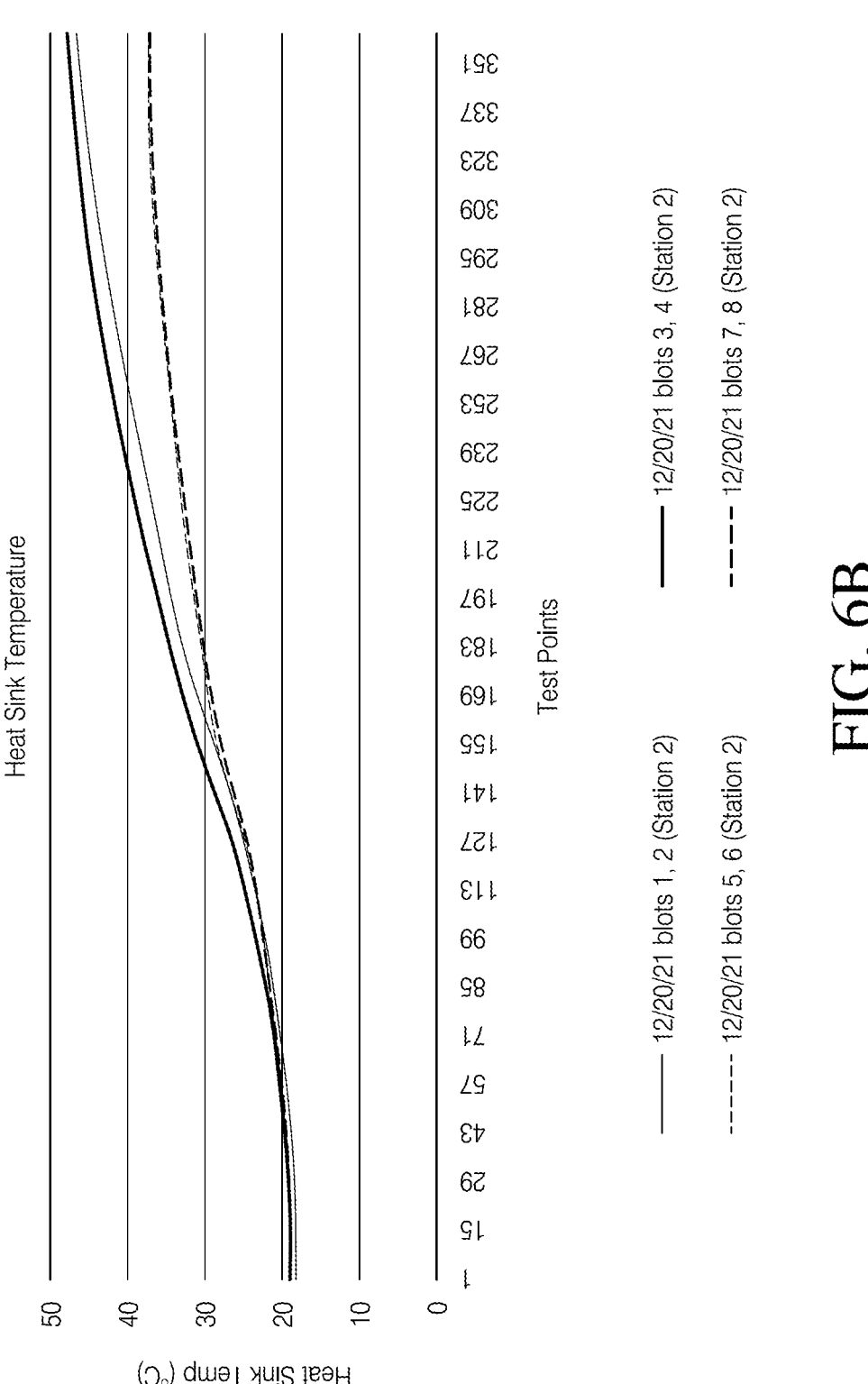

FIGS. 6A and 6B illustrate example graphs depicting heat sink temperature (indicative of stack temperature) during protein transfer runs under various cooling system settings. In FIGS. 6A and 6B, blots 1, 2, 3, and 4 were run with the fan off, whereas blots 5, 6, 7, and 8 were run with the fan operating at 70% capacity, providing an approximately 9 degrees Celsius reduction in heat sink temperature relative to the "fan off" runs. FIG. 6B furthermore illustrates that the temperature curve (e.g., temperature over time) exhibited by the heat sink during protein transfer runs may be more accurately repeated and/or reproduced by operation of the fan.

One will appreciate, in view of the present disclosure, that a protein transfer system (e.g., protein transfer system 100) may comprise two cooling systems, with a separate cooling associated with each of the bases and/or lids of the protein transfer system.

Example Transfer Stack Detection

Figure 7:
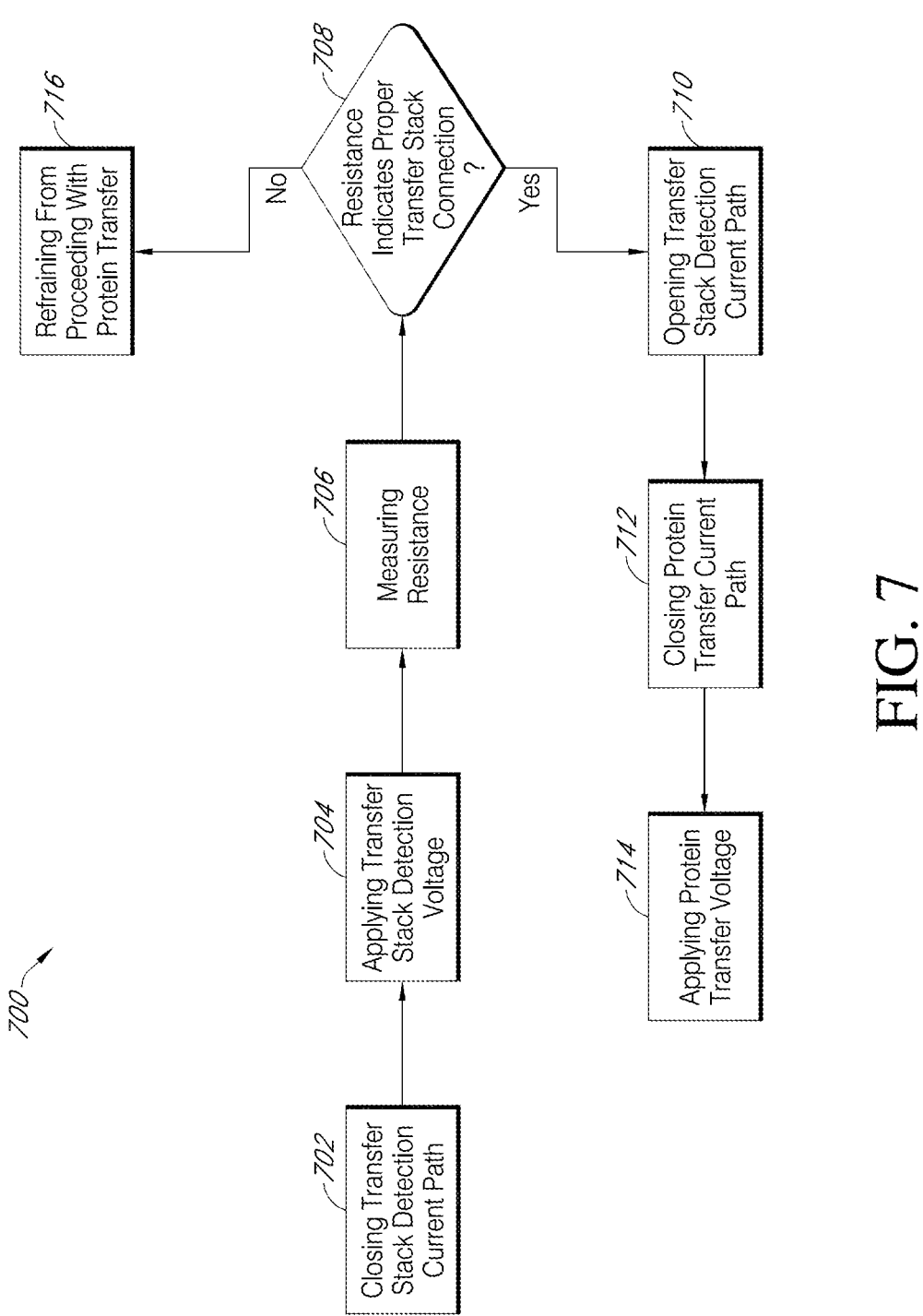
FIG. 7 illustrates an example flow diagram depicting acts associated with a transfer stack detection operation of a protein transfer system.

As noted above, conventional protein transfer systems lack mechanisms to prevent transfer stack damage that may result from improper electrical connection between the transfer stack and a voltage source. FIG. 7 illustrates an example flow diagram depicting acts associated with a transfer stack (or "consumable") detection operation 700 that may be performed by a protein transfer system (e.g., protein transfer system 100 via processor(s) 102, storage 104, and/or other components such as switches).

Act 702 of the transfer stack detection operation 700 includes closing a transfer stack detection current path. The transfer stack detection current path may include the one or more electrodes of the protein transfer system (e.g., cathode plate 126 and anode contacts 128) for directing current through the consumable protein transfer stack(s) (if present). The transfer stack detection current path may further include a dummy load configured to restrict current flow through the transfer stack detection current path. In some implementa-tions, the dummy load has a resistance within a range of about 10 ohms to about 22 ohms (e.g., 16 ohms) as provided by one or more resistors. In the event of a short circuit, the dummy load may prevent damage to the protein transfer stack.

Act 704 of the transfer stack detection operation 700 includes applying a transfer stack detection voltage to the transfer stack detection current path. In some implementa-tions, the transfer stack detection voltage is within a range of about 5V to about 13V.

Act 706 of the transfer stack detection operation 700 includes measuring a transfer stack resistance resulting from the transfer stack detection voltage being applied to the transfer stack detection current path (e.g., in accordance with act 704). The measurement may be accomplished via one or more microcontrollers. The resistance measured in accordance with act 706 may indicate whether a proper connec-tion exists between the protein transfer system and a con-sumable protein transfer stack. Accordingly, act 708 of the transfer stack detection operation includes determining whether the measured resistance indicates proper transfer stack connection. For instance, act 708 may comprise deter-mining whether the measured resistance (e.g., the "transfer stack resistance") satisfies a transfer stack detection condi-tion. By way of non-limiting example, where the dummy load in the transfer stack detection current path comprises 16 ohms, a detected resistance within a range of about 4 ohms to about 80 ohms may indicate a proper connection between the protein transfer system and a protein transfer stack. A detected resistance below about 4 ohms may indicate that a short circuit exists in the connection, whereas a detected resistance greater than about 80 ohms may indicate that an open circuit exists. Other ranges/conditions are within the scope of the present disclosure.

In response to determining that the measured resistance satisfies the transfer stack detection condition(s) (indicated by the "Yes" following from act 708 in FIG. 7), the transfer stack detection current path may be opened (act 710), and a different current path for facilitating a protein transfer run may be closed (act 712) (e.g., a "protein transfer current path"). The protein transfer current path may also include the one or more electrodes of the protein transfer system 100 (e.g., the cathode plate 126 and the anode contact(s) 128) for directing current through the one or more consumable protein transfer stacks. The protein transfer current path omits the dummy load associated with the transfer stack detection current path.

With the protein transfer current path closed (according to act 712), a protein transfer voltage may be applied to the protein transfer current path (act 714), thereby facilitating a protein transfer run utilizing the protein transfer stack deter-mined to be connected to the protein transfer system. In some implementations, the protein transfer voltage is within a range of about 5V to about 35V. In some instances, the protein transfer voltage applied in accordance with act 714 is higher than the transfer stack detection voltage applied in accordance with act 704.

In response to determining that the measured resistance fails to satisfy the transfer stack detection condition(s) (indicated by the "No" following from act 708 in FIG. 7), a system may refrain from applying a protein transfer current to the protein transfer current path (act 716). In some instances, a system may further display (e.g., via the user interface element 120) an indication that the transfer stack detection condition(s) is/are not satisfied (e.g., by providing a user prompt to correct the connection between the protein transfer stack and the protein transfer system).

Example Speaker Systems of Protein Transfer Systems

Figure 8:
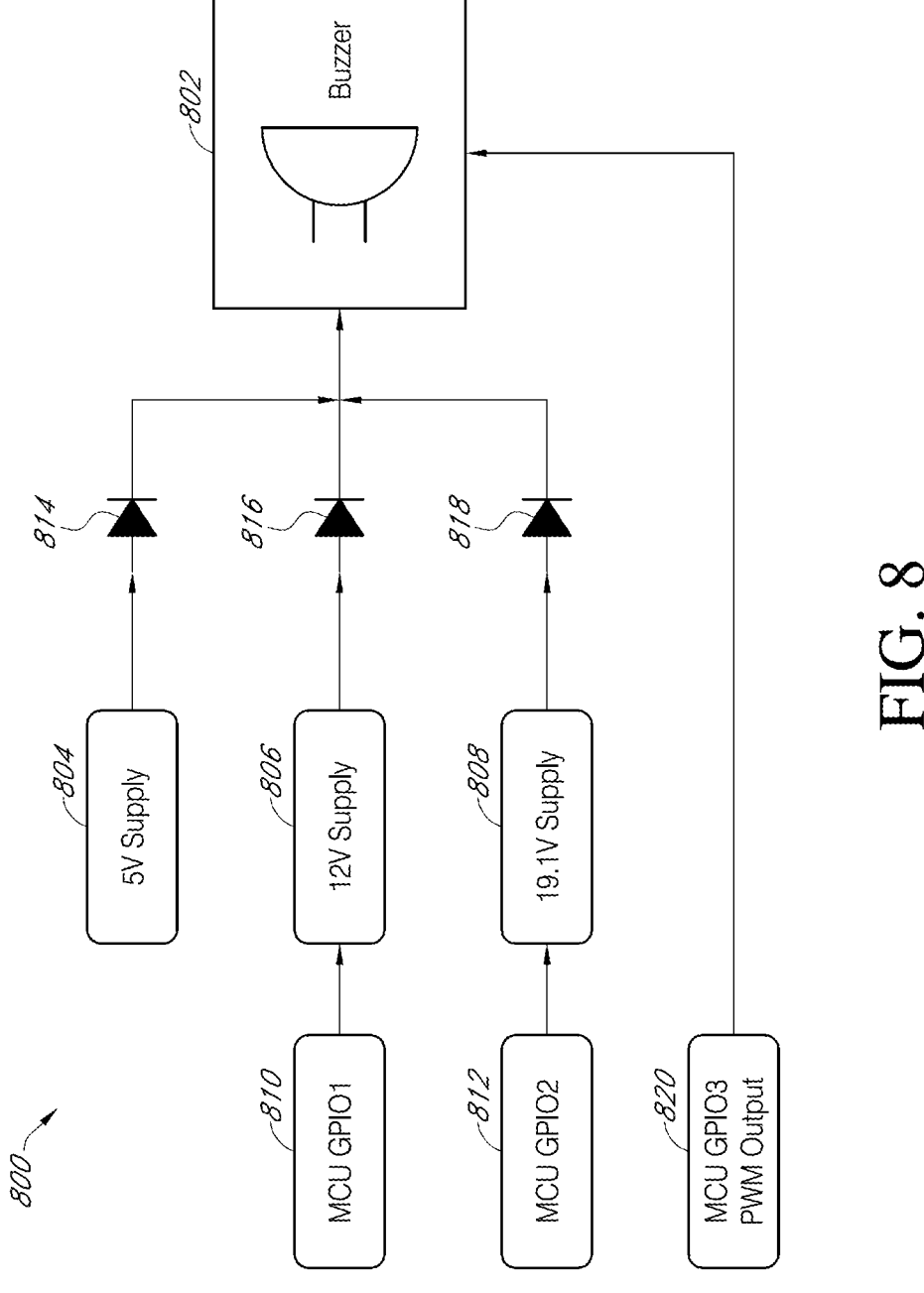
FIG. 8 illustrates an example schematic diagram of a speaker system associated with a protein transfer system.

FIG. 8 illustrates an example schematic diagram of a speaker system 800 associated with a protein transfer system (e.g., protein transfer system 100). FIG. 8 illustrates a speaker (represented as buzzer 802 in FIG. 8) that is connected to various voltage supplies 804, 806, and 808. The various voltage supplies 804, 806, and 808 may be controlled to cause the buzzer 802 to operate at various different voltage levels to output sound at different loudness levels.

As indicated in FIG. 8, the different voltage supplies 804, 806, and 808 are associated with different voltage levels. For example, when voltage supply 804 is active (and voltage supplies 806 and 808 are inactive), a first voltage (e.g., 5V) is supplied to the buzzer 802, causing sound of a first loudness level to be emitted from the buzzer 802. The other voltage supplies 806 and 808 may be selectively controlled via microcontrollers 810 and 812, respectively, to operate in combination with the voltage supply 804 to cause the buzzer 802 to operate at higher voltages than the first voltage (producing louder sound). For example, microcontroller 810 may cause voltage supply 806 to operate in combination with voltage supply 804 to cause a second voltage (e.g., 12V) to be supplied to the buzzer, causing sound of a second loudness level to be emitted from the buzzer 802. Microcontroller 812 may cause voltage supply 808 to operate in combination with voltage supply 804 (and, in some instances, in further combination with voltage supply 806) to cause a third voltage (e.g., 19.1V) to be supplied to the buzzer, causing sound of a third loudness level to be emitted from the buzzer 802. Reverse protection diodes 814, 816, and 818 may be implemented in association with the various voltage supplies 804, 806, and 808, respectively, to protect the components.

FIG. 8 furthermore shows an additional microcontroller 820 configured to control the frequency and/or duty cycle of the tone emitted by the buzzer 802. The additional microcontroller 820 may be utilized to modulate/select the tones emitted by the buzzer 802 to enable customized buzzer tones (e.g., allowing for simple melody music to be emitted by the buzzer 802).

The features of the speaker system 800 of FIG. 8 may enable protein transfer systems to emit sounds with a loudness level that is tailored to the ambient laboratory conditions. For example, a protein transfer system situated in a lab with a high level of ambient noise may operate a buzzer/speaker with a higher voltage to enable the sound emitted by the protein transfer system to be heard within the noisy lab environment, whereas a protein transfer system situated in a lab with a low level of ambient noise may operate a buzzer/speaker with a lower voltage.

Additional Computer System Details

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

In some implementations, systems of the present disclosure may comprise or be configurable to execute any combination of software and/or hardware components that are operable to facilitate processing using machine learning models or other artificial intelligence-based structures/architectures. For example, one or more processors may comprise and/or utilize hardware components and/or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

The invention claimed is:

1. A protein transfer system, comprising:
at least one base configured to receive one or more consumable protein transfer stacks;
at least one lid engaged with and moveable relative to the at least one base, the at least one lid being configured to cover the at least one base, the at least one lid comprising one or more electrodes for supplying current to the one or more consumable protein transfer stacks,
wherein the at least one lid comprises one or more compression features configured to secure over at least a portion of a perimeter edge of a consumable protein transfer stack of the one or more consumable protein transfer stacks when the at least one lid is closed over the consumable protein transfer stack,
wherein the one or more electrodes comprise one or more cathode plates and one or more anode contacts, and
wherein the one or more cathode plates is/are configured to translate in at least one dimension relative to the one or more compression features;
at least one voltage source comprised in the at least one base and configured to supply the current to the one or more consumable protein transfer stacks;
one or more processors; and
one or more hardware storage devices storing instructions that are executable by the one or more processors to configure the protein transfer system to control operation of the at least one voltage source.

2. The protein transfer system of claim 1, further comprising a user interface element configured to display information related to operation of the protein transfer system and/or receive user input for facilitating control of the at least one voltage source.

3. The protein transfer system of claim 1, wherein the at least one base comprises two bases.

4. The protein transfer system of claim 3, wherein each base of the two bases is independently configured to (1) house a first consumable protein transfer stack of a first size of the one or more consumable protein transfer stacks or (2) house two second consumable protein transfer stacks of the one or more consumable protein transfer stacks, each second consumable protein transfer stack being of a second size, the second size being smaller than the first size.

5. The protein transfer system of claim 3, wherein the at least one lid comprises (1) a first lid configured to cover a first base of the two bases, and (2) a second lid configured to cover a second base of the two bases.

6. The protein transfer system of claim 3, wherein the protein transfer system is configured to independently control voltage, program method, starting time, ending time, cooling system control, and/or other protein transfer parameters for the two bases.

7. The protein transfer system of claim 1, wherein the at least one lid comprises multiple lids, and wherein the at least one voltage source is configured to independently supply voltage to the multiple lids.

8. The protein transfer system of claim 1, further comprising a cooling system, the cooling system comprising:

at least one heat sink in thermal communication with a corresponding cathode plate of the one or more cathode plates of a corresponding lid of the at least one lid;

at least one air inlet;

at least one air outlet; and at least one fan configured to draw air through the at least one air inlet and direct the air along an air-cooling path that extends through the at least one heat sink and toward the at least one air outlet.

9. The protein transfer system of claim 8, wherein the at least one air inlet and/or the at least one air outlet is/are arranged on the at least one lid.

10. The protein transfer system of claim 8, wherein the instructions are executable by the one or more processors to configure the at least one fan to operate during a protein transfer operation.

11. The protein transfer system of claim 10, wherein the instructions are executable by the one or more processors to configure the at least one fan to cause a temperature associated with the at least one base to approach or achieve a predetermined target temperature or temperature curve during the protein transfer operation.

12. The protein transfer system of claim 8, wherein the instructions are executable by the one or more processors to configure the at least one fan to automatically begin operating at a predetermined time point during a protein transfer operation.

13. The protein transfer system of claim 8, wherein the at least one base comprises a first base and a second base, wherein the cooling system is a first cooling system independently associated with the first base, and wherein the protein transfer system comprises a second cooling system, the second cooling system being independently associated with the second base.

14. The protein transfer system of claim 1, wherein the one or more cathode plates are configured to translate from a disengaged position to an engaged position, and vice versa.

15. A protein transfer system, comprising:

at least one base configured to receive one or more consumable protein transfer stacks;

at least one lid engaged with and moveable relative to the at least one base, the at least one lid being configured to cover the at least one base, the at least one lid comprising one or more electrodes for supplying current to the one or more consumable protein transfer stacks, at least one voltage source comprised in the at least one base and configured to supply the current to the one or more consumable protein transfer stacks;

one or more processors; and one or more hardware storage devices storing instructions that are executable by the one or more processors to configure the protein transfer system to control operation of the at least one voltage source, wherein the instructions are executable by the one or more processors to configure the protein transfer system to perform a consumable detection operation, the consumable detection operation comprising:

closing a consumable detection current path, the consumable detection current path including the one or more electrodes for directing current through the one or more consumable protein transfer stacks, the consumable detection current path further including a dummy load configured to restrict current flow through the consumable detection current path;

applying a consumable detection voltage to the consumable detection current path;

measuring a consumable resistance resulting from the consumable detection voltage being applied to the consumable detection current path;

determining whether the consumable resistance satisfies a consumable detection condition; and in response to determining that the consumable resistance satisfies the consumable detection condition, opening the consumable detection current path and closing a protein transfer current path, the protein transfer current path including the one or more electrodes for directing current through the one or more consumable protein transfer stacks, the protein transfer current path omitting the dummy load.

16. The protein transfer system of claim 15, wherein the instructions are executable by the one or more processors to further configure the protein transfer system to, in response to determining that the consumable resistance satisfies the consumable detection condition, apply a protein transfer voltage to the protein transfer current path to facilitate protein transfer within the one or more consumable protein transfer stacks.

17. The protein transfer system of claim 16, wherein the protein transfer voltage is higher than the consumable detection voltage.

* * * * *